US009073486B1

(12) United States Patent
Meszaros et al.

(10) Patent No.: US 9,073,486 B1
(45) Date of Patent: Jul. 7, 2015

(54) DEPLOY AND EXTEND STEP PAD

(71) Applicant: Ford Global Technologies, LLC, Dearborn, MI (US)

(72) Inventors: Edward Joseph Leonard Meszaros, Amherstburg (CA); David Thomas Patrick, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/158,129

(22) Filed: Jan. 17, 2014

(51) Int. Cl.
*B60R 3/02* (2006.01)
*B60R 3/00* (2006.01)

(52) U.S. Cl.
CPC ...................................... *B60R 3/002* (2013.01)

(58) Field of Classification Search
CPC .......... B60R 3/00; B60R 3/002; B60R 3/005; B60R 3/02
USPC .................. 280/163, 164.1, 164.2, 166, 169; 182/127
See application file for complete search history.

(56) References Cited

U.S. PATENT DOCUMENTS

| 6,926,295 | B2 | 8/2005 | Berkebile et al. |
| 7,086,656 | B2* | 8/2006 | Kolpasky et al. .......... 280/164.1 |
| 7,163,221 | B2 | 1/2007 | Leitner |
| 7,413,205 | B2* | 8/2008 | Watson ......................... 280/166 |
| 7,441,790 | B2 | 10/2008 | Lechkun |
| 8,342,551 | B2 | 1/2013 | Watson |
| 8,469,380 | B2 | 6/2013 | Yang et al. |
| 8,833,781 | B2* | 9/2014 | Hayes .......................... 280/163 |

OTHER PUBLICATIONS

Powerstep—Automatic Running Boards Invented by AMP Research, pickupspecialties.com, Aug. 20, 2013.

* cited by examiner

*Primary Examiner* — John Walters
(74) *Attorney, Agent, or Firm* — Jason C. Rogers; Bejin Bieneman PLC

(57) ABSTRACT

A vehicle includes a step pad assembly that includes a first step pad, a second step pad, and a telescoping extension. The second step pad is rotatably attached to the first step pad. The telescoping extension is disposed within the second step pad and is configured to extend from the second step pad to an extended position outboard relative to a rear wheel.

20 Claims, 3 Drawing Sheets

DEPLOY AND EXTEND STEP PAD

BACKGROUND

Roof storage systems allow objects to be transported on top of vehicles. Roof storage systems are most helpful for objects that are too large to fit inside the vehicle. Examples of such objects include bicycles, kayaks, skis, etc. One way to access the roof storage system includes using a stepladder or stool, which take up cargo space. Some vehicles are equipped with step pads that run between the wheels. Such step pads, however, do not permit access to the roof along the entire length of the vehicle.

DETAILED DESCRIPTION

An exemplary vehicle includes a step pad assembly that includes a first step pad, a second step pad, and a telescoping extension. The second step pad is rotatably attached to the first step pad. The telescoping extension is disposed within the second step pad and is configured to extend from the second step pad to an extended position outboard relative to a rear wheel.

The vehicle shown in the FIGS. may take many different forms and include multiple and/or alternate components and facilities. While an exemplary vehicle is shown, the exemplary components illustrated are not intended to be limiting. Indeed, additional or alternative components and/or implementations may be used.

Referring to FIGS. 1A, 1B, 2A, and 2B, the vehicle 100 includes a step pad assembly 105. The vehicle 100 may be any passenger or commercial vehicle including car, truck, sport utility vehicle, crossover vehicle, bus, train, airplane, or the like.

Figure 1A:
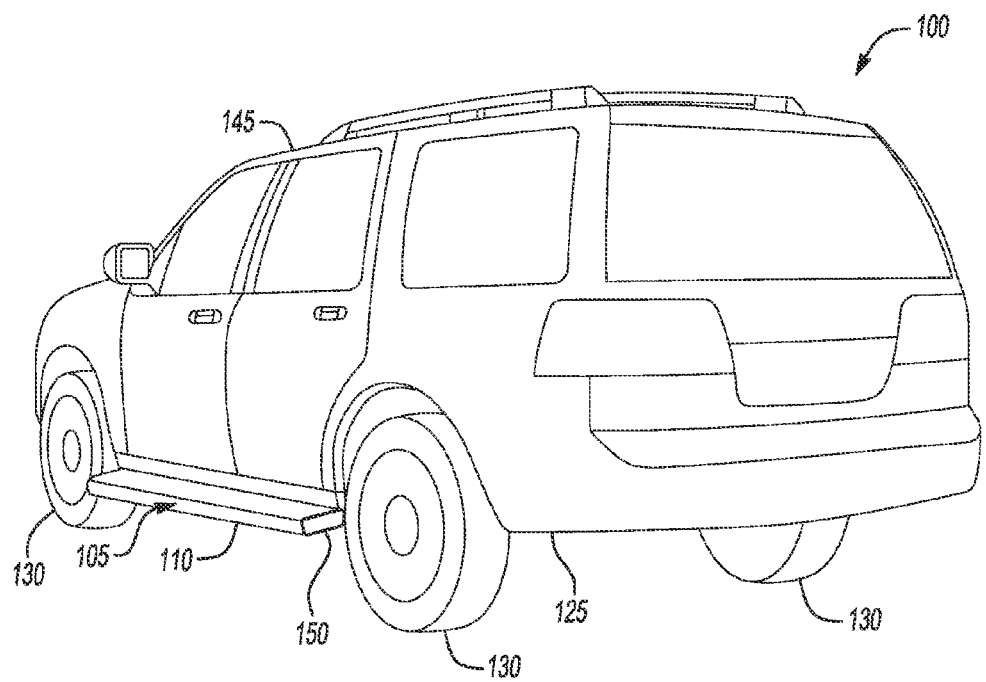
FIGS. 1A and 1B illustrate an exemplary vehicle having a deployable and extendable step pad.
Figure 1B:
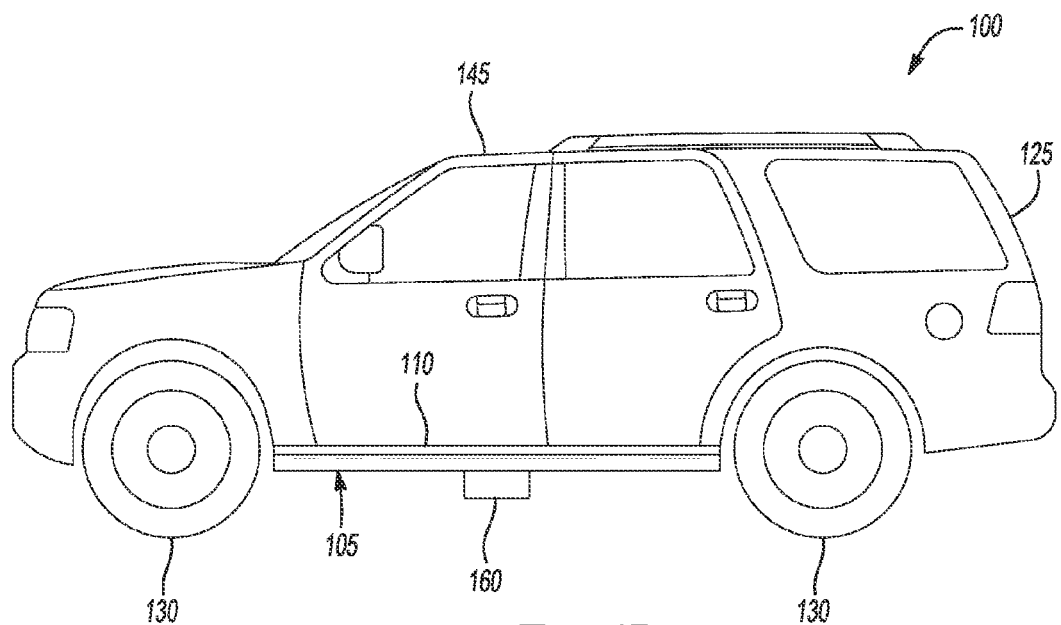
Figure 2A:
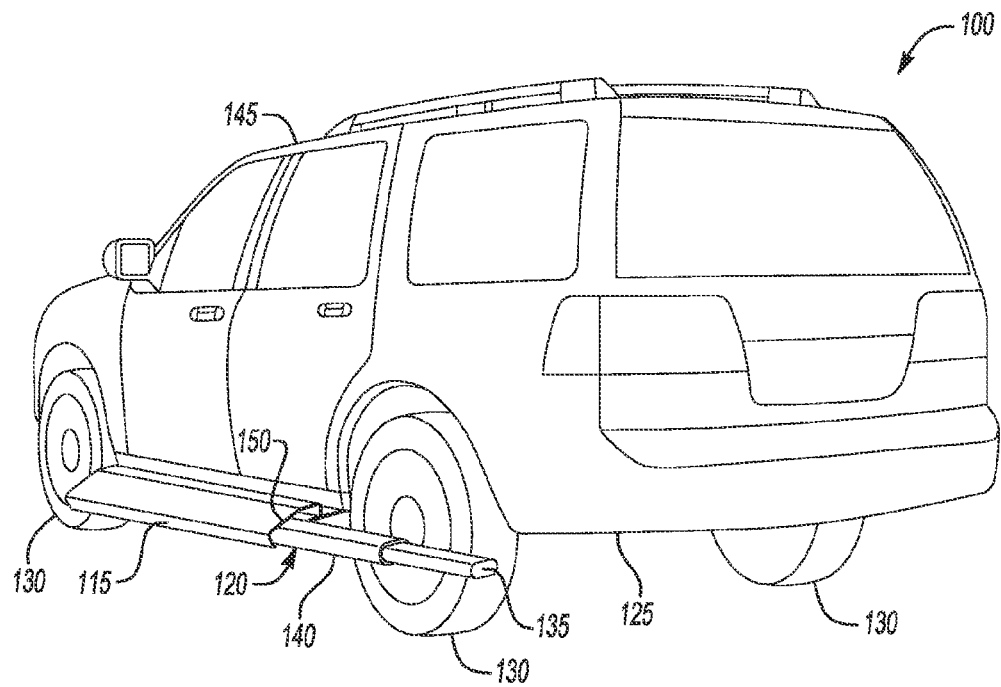
FIGS. 2A and 2B illustrate an exemplary vehicle with the step pad deployed and extended.
Figure 2B:
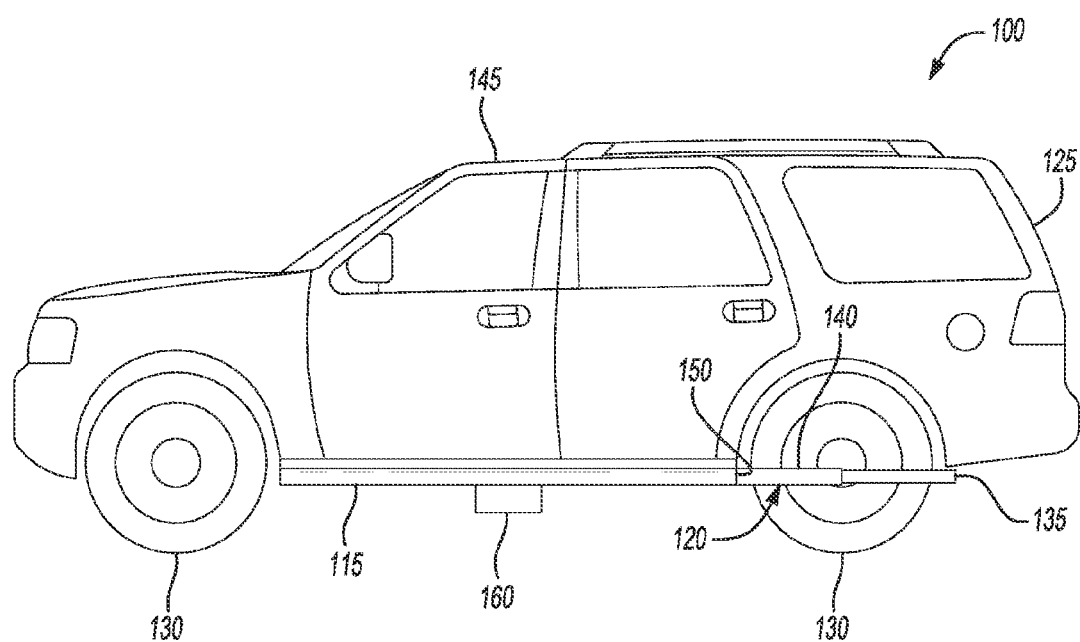

The step pad assembly 105 includes a first step pad 110, a second step pad 115, and a telescoping extension 120. The first step pad 110 and the second step pad 115 may be formed from any material with enough strength to support at least one vehicle passenger. Both the first step pad 110 and the second step pad 115 may extend along a body 125 of the vehicle 100 between the front and rear wheels 130. When in a locked position, as shown in FIGS. 1A and 1B, the telescoping extension 120 may be disposed with the second step pad 115, and the second step pad 115 may be stowed under the first step pad 110. The second step pad 115 may be rotatably attached to the first step pad 110. Thus, when moving to a deployed position, the second step pad 115 may rotate away from the vehicle 100 body 125 as shown in FIGS. 2A and 2B. The telescoping extension 120 may remain disposed within the second step pad 115 when in the deployed position. From the deployed position, the telescoping extension 120 may extend from the second step pad 115 to an extended position outboard relative to one of the rear wheels 130 of the vehicle 100.

The telescoping extension 120 shown in FIGS. 2A and 2B includes an inner portion 135 and an outer portion 140. Both the inner portion 135 and the outer portion 140 are configured to extend from the second step pad 115, toward a rear of the vehicle 100, when the second step pad 115 is in the deployed position. From the deployed position, the inner portion 135 may extend from the outer portion 140 to place the step pad assembly 105 in the extended position. In some implementations, the telescoping extension 120 may be biased to the extended position. For instance, a spring (not shown) may be located in the second step pad 115. When the second step pad 115 is in the deployed position, the spring may push the outer portion 140 and the inner portion 135 to the extended position.

The telescoping extension 120 may provide access to the roof 145 along substantially the entire length of the vehicle 100. By way of example only, the telescoping extension 120 may extend approximately 41 inches from an edge 150 of the second step pad 115. In addition, the telescoping extension 120 may be approximately 16 inches from a ground surface. Furthermore, the second step pad 115 may extend approximately 7 inches from the body 125 of the vehicle 100, and approximately 2 to 2.5 inches above the first step pad 110.

The inner portion 135 and the outer portion 140 may lock in the extended position. The inner portion 135 and the outer portion 140 may be released from the extended position when the lock is manually disengaged by, e.g., a passenger of the vehicle 100. One way to manually disengage the lock may be for a passenger to push an end of the inner portion 135 with his or her foot until the inner portion 135 and the outer portion 140 are contained within the second step pad 115. The passenger may, using his or her foot, rotate the second step pad 115 toward the vehicle 100 back to the locked position, as shown in FIGS. 1A and 1B.

Figure 3:
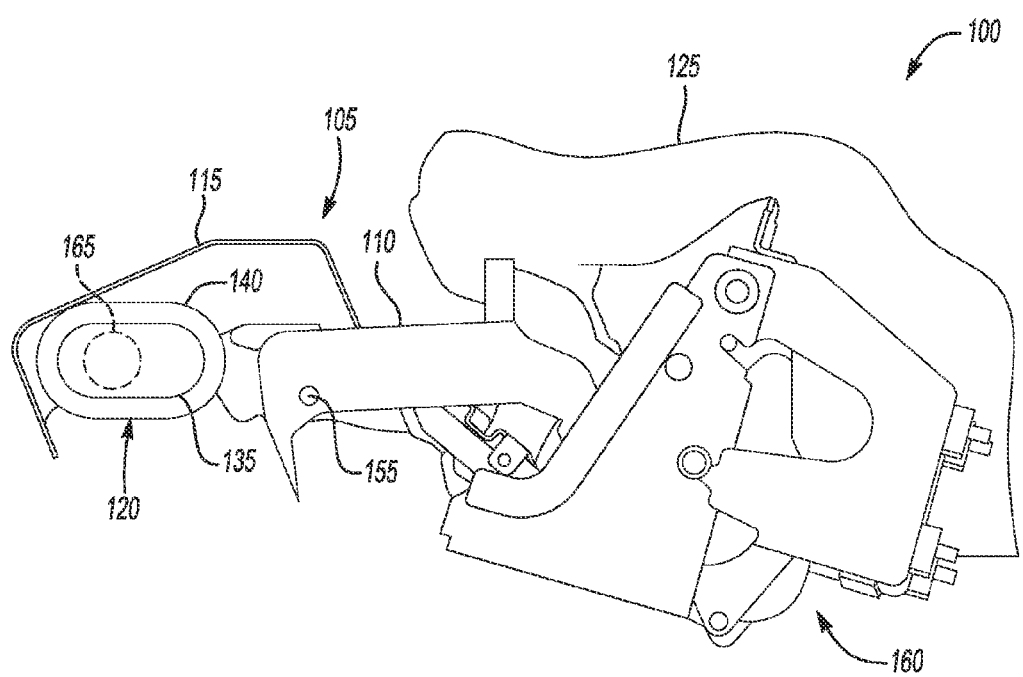
FIG. 3 illustrates an exemplary step pad assembly.

Referring now to FIG. 3, the step pad assembly 105 includes a hinge 155 configured to couple the first step pad 110 to the second step pad 115. The hinge 155 may be configured to permit rotational movement of the second step pad 115 relative to the first step pad 110. Thus, the hinge 155 may facilitate the rotation of the second step pad 115 away from the body 125 of the vehicle 100 when moving from the locked position to the deployed position.

The step pad assembly 105 may further include a deployment mechanism 160 configured to bias the second step pad 115 to the deployed position relative to the first step pad 110. In some implementations, the deployment mechanism 160 may be further configured to release the second step pad 115 from the locked position. When the second step pad 115 is released from the locked position, which may occur upon manual actuation by, e.g., a passenger's foot, the deployment mechanism 160 may push the second step pad 115 to rotate away from the body 125 of the vehicle 100. In some instances, the deployment mechanism 160 may include a spring (not shown) to bias the second step pad 115 to the deployed position.

The step pad assembly 105 may further include a reinforcement core 165 extending through the telescoping extension 120. The reinforcement core 165 may be formed from a material with sufficient strength to support a passenger's weight when the step pad assembly 105 is in the extended position. The reinforcement core 165 may extend through the inner portion 135 and the outer portion 140 of the telescoping extension 120 when in the extended position. Thus, the reinforcement core 165 may be configured to move within the second step pad 115 in accordance with the telescoping motion of the inner portion 135. In some implementations, the reinforcement core 165 may be integrally formed with the inner portion 135 or the inner portion 135 may be configured to serve as the reinforcement core 165.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A vehicle comprising:
 a first step pad;
 a second step pad rotatably attached to the first step pad;
 a telescoping extension disposed within the second step pad and configured to extend from the second step pad to an extended position outboard relative to a rear wheel, wherein the telescoping extension includes an inner portion and an outer portion, wherein the inner portion and the outer portion are configured to extend from the second step pad and wherein the inner portion is configured to extend from the outer portion; and
 a reinforcement core extending through the telescoping extension.

2. The vehicle of claim 1, further comprising a hinge configured to couple the first step pad to the second step pad.

3. The vehicle of claim 1, further comprising a deployment mechanism configured to bias the second step pad to a deployed position relative to the first step pad.

4. The vehicle of claim 3, wherein the deployment mechanism is configured to release the second step pad from a locked position.

5. The vehicle of claim 1, wherein the second step pad is configured to rotate away from a vehicle body to move from a locked position to a deployed position.

6. The vehicle of claim 5, wherein the telescoping extension is configured to extend toward a rear of the vehicle to move to the extended position.

7. The vehicle of claim 1, wherein the telescoping extension is configured to extend approximately 41 inches from an edge of the second step pad.

8. The vehicle of claim 1, wherein the telescoping extension is approximately 16 inches from a ground surface when in the extended position.

9. A deployable step pad assembly comprising:
 a first step pad;
 a second step pad rotatably attached to the first step pad;
 a telescoping extension disposed within the second step pad and configured to extend from the second step pad to an extended position outboard relative to a rear wheel of a vehicle; and
 a reinforcement core extending through the telescoping extension.

10. The deployable step pad assembly of claim 9, further comprising a hinge configured to couple the first step pad to the second step pad.

11. The deployable step pad assembly of claim 9, further comprising a deployment mechanism configured to bias the second step pad to a deployed position relative to the first step pad.

12. The deployable step pad assembly of claim 11, wherein the deployment mechanism is configured to release the second step pad from a locked position.

13. The deployable step pad assembly of claim 9, wherein the second step pad is configured to rotate away from a vehicle body to move from a locked position to a deployed position.

14. The deployable step pad assembly of claim 13, wherein the telescoping extension is configured to extend toward a rear of the vehicle to move to the extended position.

15. The deployable step pad assembly of claim 9, wherein the telescoping extension is configured to extend approximately 41 inches from an edge of the second step pad.

16. The deployable step pad assembly of claim 9, wherein the telescoping extension is approximately 16 inches from a ground surface when in the extended position.

17. A deployable step pad assembly comprising:
 a first step pad;
 a second step pad rotatably attached to the first step pad; and
 a telescoping extension disposed within the second step pad and configured to extend from the second step pad to an extended position outboard relative to a rear wheel of a vehicle, wherein the telescoping extension includes an inner portion and an outer portion, wherein the inner portion and the outer portion are configured to extend from the second step pad and wherein the inner portion is configured to extend from the outer portion.

18. The deployable step pad assembly of claim 17, wherein the second step pad is configured to rotate away from a vehicle body to move from a locked position to a deployed position.

19. The deployable step pad assembly of claim 17, further comprising a deployment mechanism configured to bias the second step pad to a deployed position relative to the first step pad.

20. The deployable step pad assembly of claim 19, wherein the deployment mechanism is configured to release the second step pad from a locked position.

\* \* \* \* \*